United States Patent
Byard et al.

(10) Patent No.: US 8,593,991 B2
(45) Date of Patent: *Nov. 26, 2013

(54) METHOD FOR SYNCHRONIZING SLEEPING NODES IN A WIRELESS NETWORK

(75) Inventors: Robert P. Byard, Sandy, UT (US); Jay Douglas George, Orem, UT (US); John P. Filoso, Pleasant Grove, UT (US)

(73) Assignee: Digi International Inc., Minnetonka, MN (US)

( * ) Notice: Subject to any disclaimer, the term of this patent is extended or adjusted under 35 U.S.C. 154(b) by 737 days.

This patent is subject to a terminal disclaimer.

(21) Appl. No.: 12/429,358

(22) Filed: Apr. 24, 2009

(65) Prior Publication Data

US 2010/0271993 A1 Oct. 28, 2010

(51) Int. Cl.
*H04L 12/28* (2006.01)
*H04L 12/66* (2006.01)

(52) U.S. Cl.
USPC ........... 370/254; 370/337; 370/338; 370/347; 370/408; 370/422; 455/255

(58) Field of Classification Search
USPC ......... 370/254, 337, 338, 408, 442; 455/11.1, 455/255, 422.1, 423, 524, 561; 709/208–211
See application file for complete search history.

(56) References Cited

U.S. PATENT DOCUMENTS

| | | | |
|---|---|---|---|
| 6,732,189 B1 | 5/2004 | Novaes | |
| 7,461,130 B1 * | 12/2008 | AbdelAziz et al. | 709/208 |
| 2001/0012757 A1 * | 8/2001 | Boyle | 455/11.1 |
| 2002/0067736 A1 * | 6/2002 | Garcia-Luna-Aceves et al. | 370/442 |
| 2004/0174829 A1 * | 9/2004 | Ayyagari | 370/254 |
| 2004/0192284 A1 * | 9/2004 | Vaisanen et al. | 455/422.1 |
| 2005/0174950 A1 * | 8/2005 | Ayyagari | 370/254 |
| 2005/0201301 A1 * | 9/2005 | Bridgelall | 370/254 |
| 2006/0014536 A1 | 1/2006 | Demirhan et al. | |
| 2006/0205373 A1 * | 9/2006 | Lu | 455/255 |
| 2007/0127421 A1 | 6/2007 | D'Amico et al. | |

FOREIGN PATENT DOCUMENTS

| | | |
|---|---|---|
| EP | 1458141 | 9/2004 |
| EP | 1465362 | 10/2004 |
| EP | 1487155 | 12/2004 |
| WO | 2008116196 | 9/2008 |

OTHER PUBLICATIONS

Aguayo, Daniel, et al., "Link-level Measurements from an 802.11b Mesh Network", SIGCOMM '04, Aug. 30-Sep. 3, 2004, Portland, Oregon, (2004), 11 pp.
Kim, Kyu-Han, et al., "On Accurate Measurement of Link Quality in Multi-hop Wireless Mesh Networks", MobiCom '06, Sep. 23-26, 2006, Los Angeles, California, (2006), 38-49.
European Patent Office, "European Search Report", "from Foreign Counterpart of U.S. Appl. No. 12/429,358", Apr. 16, 2013, pp. 19, Published in: EP.

* cited by examiner

*Primary Examiner* — Andrew Lai
*Assistant Examiner* — Chuong M Nguyen
(74) *Attorney, Agent, or Firm* — Fogg & Powers LLC

(57) ABSTRACT

A system and method of operating a wireless network having a plurality of nodes. Each node determines whether to replace the beacon node. When a node determines that the beacon node is to be replaced, the node determines whether it should nominate itself as a potential replacement beacon node. The decision whether to nominate itself as a potential replacement beacon node is a function of a random number generated by the node. If the node determines that it should nominate itself as a potential replacement beacon node, the node sends out one or more beacon signals. Beacon signals are received by potential replacement nodes and, if the potential replacement beacon node has received a beacon signal from a higher ranking potential replacement beacon node, the node removes itself as a candidate for the replacement beacon node.

22 Claims, 8 Drawing Sheets

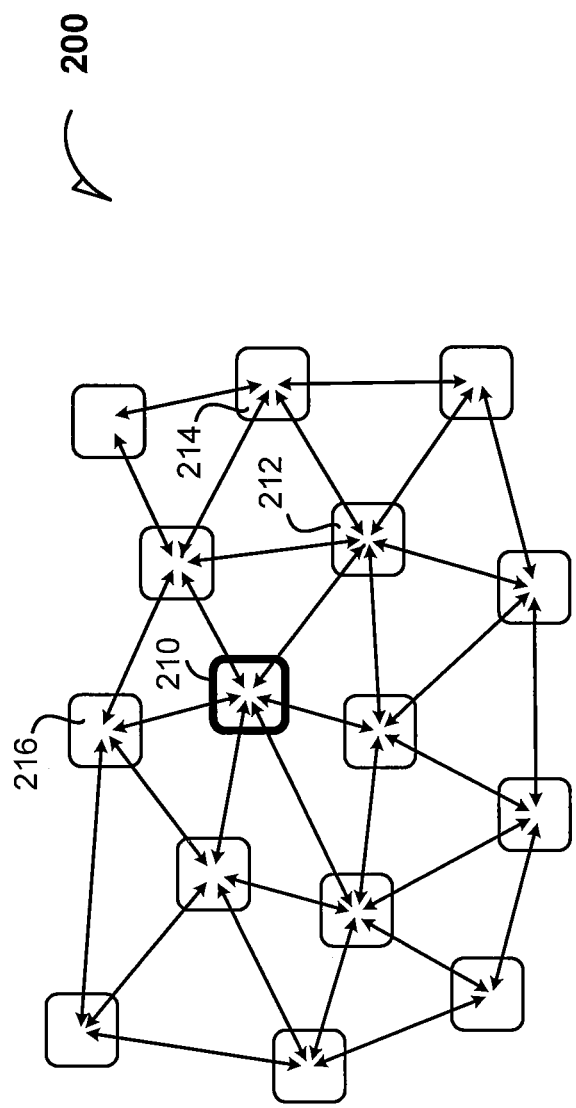

METHOD FOR SYNCHRONIZING SLEEPING NODES IN A WIRELESS NETWORK

TECHNICAL FIELD

The disclosure relates generally to synchronizing nodes in a wireless mesh network.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

To conserve power, it is desirable for the nodes of a wireless network to cycle between sleeping and waking phases. During the sleeping phase, a node shuts down its communication and other major functions and draws very little current, thereby saving power. During the waking phase, a node powers its transceiver and exchanges messages with other nodes in the network. One problem faced in such networks is how to maintain agreement, or to synchronize, the clocks of different network nodes so that they wake at approximately the same time.

In the past, networks have addressed the problem of synchronization is a number of ways. Some networks have relied, directly or indirectly, on an external time reference such as the internet. The internet ultimately uses the Internet Time Service (ITS), provided by NIST and USNO, where servers respond to requests using the Network Time Protocol (NTP) by supplying time of day responses with accuracy and precision traceable to centralized government standards. The problem with this approach is that it depends on an authority, standard, or reference which is external and therefore may be unavailable to a wireless network due to physical isolation or interference.

Other networks have relied on a local time reference authority, such as a dedicated node. The dedicated node periodically generates a synchronizing message to be used as a time reference by all the other nodes in the network. The problem with this approach is that it depends on a dedicated node which, by design, creates the potential for a single point of failure. If the dedicated node were to fail, the entire network would lose synchronization. Eventually, the loss of synchronization due to accumulated clock drift would cause the nodes to lose communication with each other, causing the network to fail.

What is needed is a system and method for synchronizing nodes that addresses these issues and others that will become apparent while reading this specification.

BRIEF DESCRIPTION OF THE DRAWINGS

FIG. 2a is a schematic representation of a plurality of nodes that make up a wireless network according to an example embodiment;

DETAILED DESCRIPTION

Figure 1A:
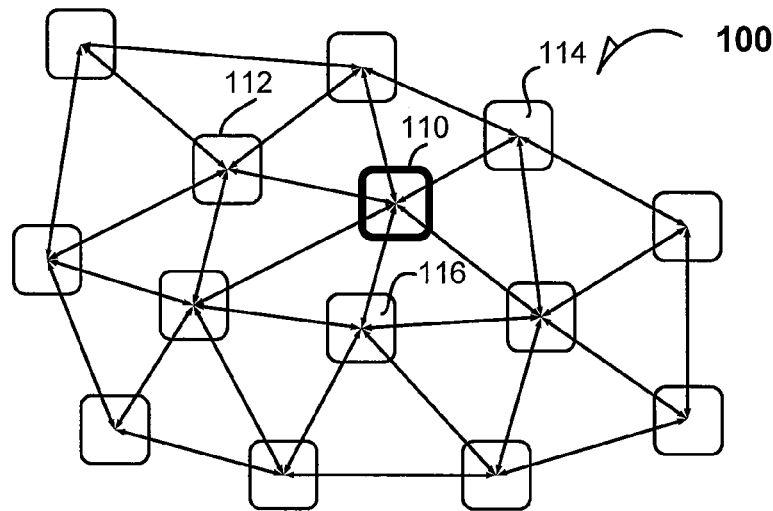
FIG. 1a is a schematic representation of a plurality of nodes that make up a wireless network according to an example embodiment.

As we noted above, it can be a problem to rely on an external time reference, since the external time reference may be or may become unavailable. We instead use an internal time reference, designating a single node to act as the time authority for a network. This node is tasked with broadcasting a time synchronization message, a beacon, throughout the network during the waking phase.

In the past, such an approach resulted in a single point of failure. To avoid this problem, we teach that more than one node in the network should have the ability to detect and replace a failed beacon node. Should the designated node fail, then the other nodes in the network select a replacement through a nomination-election process.

In one such approach, only one node at a time acts as the beacon of time synchronization messages. The synch message is broadcast during the waking cycle. The synch message contains a field which describes the time offset until the start of the next waking cycle. As the synch message is relayed, the relaying node reduces the time offset value in the message to compensate for the time which was lost during reception and re-transmission.

In such an embodiment, nodes that are not the beacon node receive beacon signals and use the beacon signals to adjust settings such as sleeping configuration parameters. Further, the receiving node relays the messages received from the beacon to neighbor nodes. Information regarding neighbor nodes may be stored in a neighbor table (NT).

In some embodiments, several types of beaconed messages may be conveyed by the beacon node during the waking interval. One beaconed message is clock synchronization. Another beaconed message is a status inquiry regarding node activity. For example, a node may drop out of the wireless network for any number of reasons, and network status may be adjusted depending on the number of active nodes. The beacon node can also transmit messages containing its address, or a guard interval used by the receiving node to delay a certain time before accepting a synchronization message.

The nomination-election process is invoked when the designated beacon node fails. First, nodes in the network detect the absence of synch messages. One or more nodes nominate themselves as the new beacon nodes. In one embodiment, if a node experiences a configured number of consecutive cycles without receiving a time synchronization message, then, by a configured probability, it nominates itself to act as a beacon during the next waking cycle.

Because more than one node may nominate itself to act as a time synch generator at the same time, it is necessary to reduce the number to a single node. The system uses an election process to select between nodes nominated for the beacon. In one such election process, a beaconing node removes itself as a beacon candidate should it receive a synch message from a competing node which outranks it. Nodes may, for instance, be ranked by MAC address, the value of which is unique for every node. The election criteria should be such that every node is ranked in a unique and ordinal manner. For example, one could decide by which node has the superior rank according to a preconfigured value which is unique to each node.

In one embodiment, nodes that receive sync messages from more than one beacon node update their configuration parameters with the latest sync message from the highest ranking node. In some embodiments, the MAC address of the node is used to establish the highest ranking node (i.e., the beacon node with the lowest, or highest, MAC address is the highest ranking node). In other embodiments, the highest ranking node may be a function of how close the node is to the receiving node, or how close the node is to the center of the wireless network, or may be indicated by the relative accuracy of a node's clock, or by an operator's configuration choice (e.g., a "preferred node indicator" in a sync message), or by a coded ranking field placed in the sync message, or by the time since a node was last configured by the operator.

In one such embodiment, if a node received a sync message during the waking interval, an update to the time clock is deferred until just before the node goes to sleep. This allows the node to select between sync messages in the event more than one was received during that wake interval.

In one embodiment, the probability that a node will nominate itself is a parameter configured by someone such as the system administrator. In one such embodiment the probability selected is in inverse proportion to the size of the network. This reduces the number of nodes which will compete for the role of beacon, thereby reducing congestion, and improving the speed with which a single beacon node will emerge as beacon.

One advantage of the described approach is that time authority within such a network is robust by design. No central authority is used to establish an external time reference. At the same time, no dedicated node is used to establish the time reference.

The solution is robust in that the network can automatically replace a failed beacon node. The time synchronization function, therefore, has no single point of failure.

FIG. 1a is a schematic representation of a wireless network 100 according to one aspect of the present invention. In FIG. 1, wireless network 100 includes a plurality of wireless nodes. Several nodes are depicted, including a beacon node 110. The remaining nodes, including nodes 112, 114, and 116, are referred to as common nodes. In the example shown beacon node 110 is depicted in heavy outline. For the purposes of this description, a "beacon node" is a node in a wireless network that provides a beacon signal to other nodes in network 100. An assignment as beacon node may be temporary and of indeterminate duration. A "common node" is any other node in wireless network 100. Each common node is designed to have the potential to become the beacon node if necessary.

In the following, the common nodes 112 and 116 may be referred to as "interior nodes 112 and 116" since they each are located within the geographic interior of the wireless network 100. The common node 114 may be referred to as an "exterior node 114" since it is located on exterior of the geographic limitations of the wireless network 100.

A node that is currently the beacon node synchronizes all other nodes in the mesh network for cyclic sleep and wake intervals. In one embodiment, the beacon node synchronizes for specific tasks such as network maintenance functions or to compensate for latency.

As noted above, any node in network 100 may take over as the beacon node for synchronization purposes. In one embodiment, a given node may lose its position as beacon node when a difficulty arises in wireless network 100 that causes the beacon node to fail or to lose efficiency such that the wireless network fails or loses useful efficiency. Consequently, common nodes in the wireless network have the capability of self-nomination to assert their interest in becoming the beacon node.

In one embodiment, a common node determines if it should nominate itself as the new beacon node as a function of a self-nomination calculation performed by the common node. In one embodiment, the self-nomination calculation is a function of a probability parameter that is set for each common node. In one such embodiment, the probability parameter is a function of the geographic location in the network; that is, the closer the node is to the center of the network, the higher the probability that the node should assert itself as the new beacon node.

As noted above, each common node in wireless network 100 is capable of generating the beacon signal used to synchronize a cyclic function. Each node looks to receive the beacon signal at predetermined intervals. If a node fails to receive the beacon signal within the predetermined interval, it determines if it should assert itself as the new beacon node. In one embodiment, each node that fails to receive the beacon signal within the predetermined interval calculates a random number. If the random number is below a given threshold number, the node nominates itself as the new beacon node at the start of the next waking cycle. If the random number is greater than the given threshold number, the node waits a cycle before determining if it should try to nominate itself again.

Methods for generating random numbers are known and conventional. Random number generation may be carried out by a number of conventional methods. An example method of determining whether to generate a beacon signal at a given common node is given in pseudo code below.

```
def EmitSynch( )
if random( ) < THRESHOLD then
TransmitSynch( Time offset until next call to Periodic_Function )
def Periodic_Function( )
EmitSynch( )
Function2( )
Function3( )
...
schedule a call to Periodic_Function in PERIODIC seconds
def ProcessIncomingMessages( )
if there is a message to process
  if the message has not been seen before (using source and sequence number)
    switch(message.type){
      case Synch:
        reschedule call to Periodic_Function using time offset in payload of message
        update time offset in payload of message
        relay message
      ...
    }
```

```
-continued def Main( )
schedule a call to Periodic_Function in PERIODIC seconds
do forever
ProcessIncomingMessages( )
```

The beacon signal from the new beacon node informs neighbor nodes the extent of the time until the next cyclic function starts. Neighbor nodes update the message to compensate for latency, and relay the message to their neighbor nodes until the beacon propagates throughout the wireless network. In one embodiment, where a node receives multiple beacon signals during the same cycle, then it uses the last received beacon as the authority for setting the time offset until the start of the next cycle.

In an embodiment, the threshold value for transmitting a beacon signal in the absence of other beacon signals is chosen to limit the amount of beacon signal traffic as a function of network size. In one such embodiment, the threshold value for the generated random number is adjusted in inverse proportion to the size of the wireless network. Consequently in this embodiment, the probability value is adjusted downward as the size of the wireless network is increased. This adjustment of beacon-generating probability is done to maintain an adequate, without being excessive, rate of beaconing.

In one embodiment, as nodes receive more synchronization messages, they are designed to reduce the frequency of transmitting synchronization messages.

In an embodiment, the threshold value for transmitting a beacon signal in the absence of other beacon signals is chosen to prefer some common nodes over other common nodes. For instance, in one embodiment, the probability parameter is a function of the geographic location in the network; that is, the closer the node is to the center of the network, the higher the probability that the node should assert itself as the new beacon node.

One method of calculating the geographical location of the common node is to compare a tally of the total number of node hops between the common node and all other nodes. The node having the lowest tally approximately the most centrally located node. It should, therefore, receive a preference to be the next beacon node.

Returning to FIG. 1a, beacon node 110 has just succeeded in transforming from an interior common node by one of the methods described above. Beacon node 110 continues to transmit the beacon signal until it fails or is replaced.

Figure 1B:
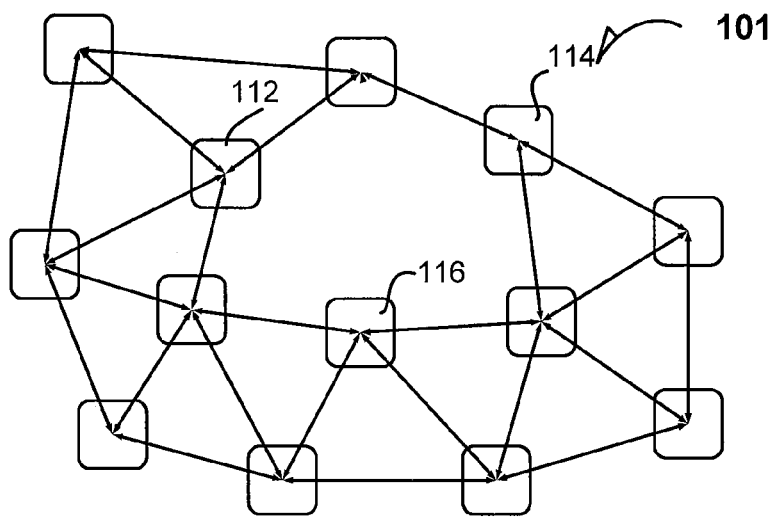
FIG. 1b is a schematic representation of a failed beacon node in a wireless network according to an embodiment.

FIG. 1b is a schematic representation of a failed beacon node in a wireless network 101 according to an embodiment. As depicted in FIG. 1a, a beacon node 110 was present but it has failed for any number of reasons. For example, the beacon node 110 may have been a mobile device that has been removed from the vicinity of the wireless network 100 (FIG. 1a) such that communication has been lost from the wireless network 101 (FIG. 1b). The beacon node 110 (FIG. 1a) by way of example may have suffered a power failure such as a depleted battery that was the power source such that communication has been lost. The beacon node 110 (FIG. 1a) by way of example may have been blocked in signal strength by an object such as a door opening or closing or such as a vehicle that has moved into the main path of broadcasting for the former beacon node, such that communication has been lost.

As depicted in FIG. 1b, the wireless network 101 exists without a beacon node. When no beacon is received after a period of time, each common node generates a random number that is compared to a predefined threshold value in order to determine whether that node should transmit a beacon signal. Each node that transmits a beacon signal in a given cycle is nominated to become the new beacon node.

If two or more common nodes are nominated, an election process must choose between them. In one embodiment, the election method, consisting of some programmed criteria, removes a nominated beacon node if it receives a synch message from a competing node which outranks it. The election criteria should be such that every node is ranked in a unique and ordinal manner. For example, the ranking could be by which node has the greater (or lesser) MAC address, the value of which is unique per node. Or the ranking could be by which node has the superior rank according to a preconfigured value which is unique to each node.

In one example embodiment, therefore, when one nominated common node receives a beacon signal from a second nominated common node it compares one or more parameters associated with the transmitter node against the same parameters at the nominated node that received the beacon signal. For example, the node that received the beacon signal could compare its MAC address with the MAC address of the transmitting node. If the receiving node compared to the transmitter node has the higher MAC address, it continues to send out the beacon signal. If, however, the receiving node compared to the transmitter node has the lower MAC address, it stops sending out the beacon signal. This continues until only a single beacon node remains.

In another example embodiment, the receiving node compares its clock accuracy against that of the transmitting node and stops sending the beacon signal if its clock accuracy is worse than that of the transmitting beacon. In another example embodiment, the receiving node looks at a field in the beacon signal. If the field has been coded as a result of operator configuration to indicate the transmitting node's beacon should prevail, the receiving beacon stops sending the beacon signal. In yet other example embodiments, the receiving node compares its operator configured ranking against that of the transmitting node, or compares the time since its last operator configuration against that of the transmitting node.

In one embodiment, when we select a new beacon node, we want to favor nodes close to the center of network 100 while disfavoring nodes farther away from the center of network 100. In one such embodiment, the node that received the beacon signal could compare its total node-hop tally with the node-hop tally of the transmitting node. If the receiving node compared to the transmitter node has the lower total number of node hops between it and all other nodes, it continues to send out the beacon signal. If, however, the receiving node compared to the transmitter node does not have the lower total number of node hops between it and all other nodes, it stops sending out the beacon signal. This continues until only a single beacon node remains.

The network is, therefore, synchronized by an emergent behavior of the mob of nodes, rather than by that of a selected or predetermined node, or a centralized time authority, or a time reference external to the network.

Figure 1C:
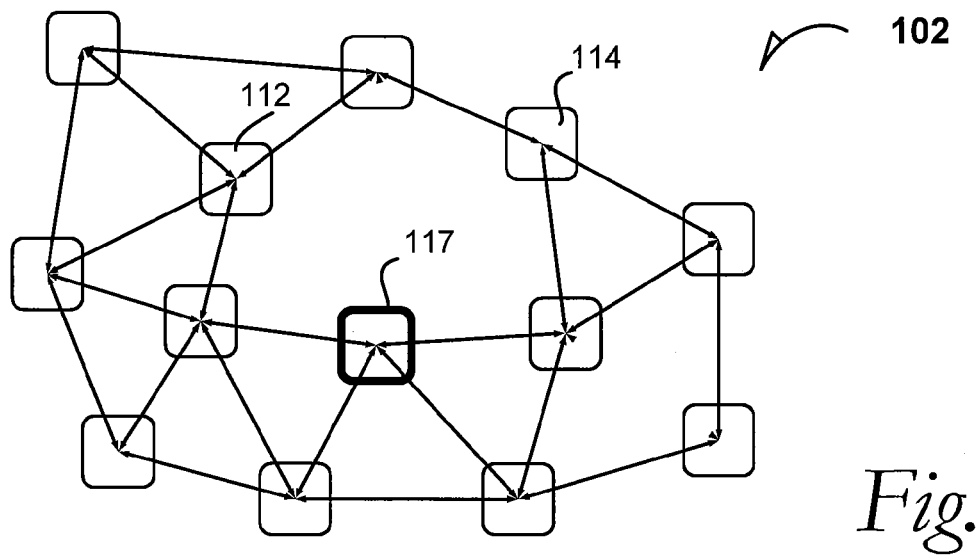
FIG. 1c is a schematic representation of a plurality of nodes that make up a wireless network after the result depicted in FIG. 1b according to an example embodiment.

FIG. 1c is a schematic representation of a plurality of nodes that make up a wireless network 102 after the result depicted in FIG. 1b according to an example embodiment. The wireless network 102 is represented as a more recent state of the wireless network 101 depicted in FIG. 1b. As a result of each common node having participated in a beacon node election process, the former common node 116 (FIG. 1b) has been elected to be the new beacon node 117 (FIG. 1c).

Figure 1D:
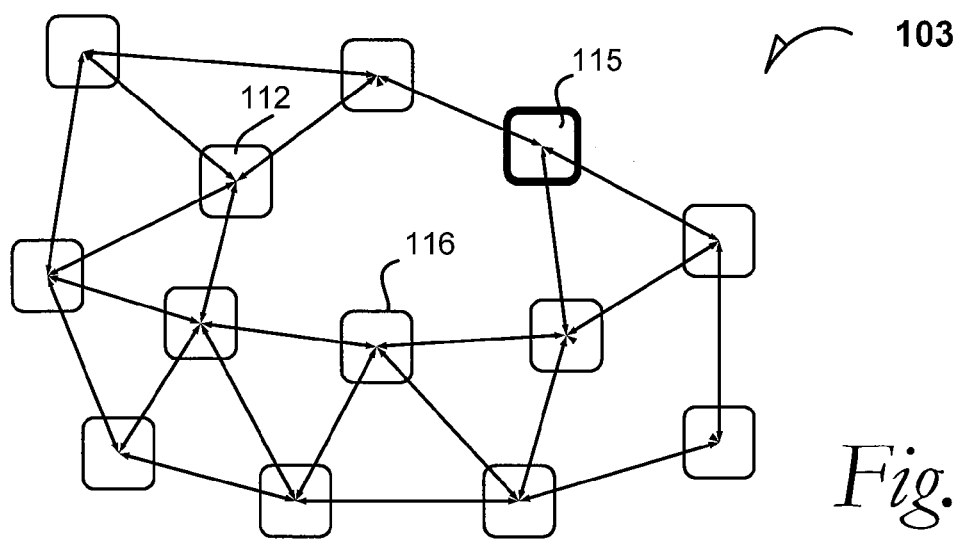
FIG. 1d is a schematic representation of a plurality of nodes that make up a wireless network after the result depicted in FIG. 1b according to an example embodiment.

FIG. 1d is a schematic representation of a plurality of nodes that make up a wireless network 103 after the result depicted in FIG. 1b according to an example embodiment. FIG. 1d represents an alternative embodiment after the event depicted in FIG. 1b. The wireless network 103 is represented as a more recent state of the wireless network 101 depicted in FIG. 1b. As a result of each common node having participated in a beacon node election process, the former common node 114 (FIG. 1b) has been elected to be the new beacon node 115 (FIG. 1d). As illustrated by way of example, although the physical and geographical limitations of the common node 114 (FIG. 1b) have not significantly changed, the former common node 114 (FIG. 1b) has been elected to become the new beacon node 115 (FIG. 1d). As illustrated according to an embodiment, the new beacon node 115 is an exterior beacon node 115.

FIG. 2a is a schematic representation of a plurality of nodes that make up a wireless network 200 according to an example embodiment. Several nodes are depicted including a beacon node 210 and some common nodes 212, 214, and 216 are also depicted, although all unmarked nodes may be referred to as common nodes. The beacon node 210 is depicted in heavy outline.

In one embodiment, when we select a new beacon node, we want to favor nodes close to the center of network 100 while disfavoring nodes farther away from the center of network 100.

In an embodiment, a cyclic function for the wireless network 200 has initiated an election to find a useful beacon node. The election may result in the beacon node 210 losing beacon node status and a new beacon node being elected.

As the cyclic function is initiated to either retain the current beacon node 210 or to select a useful new beacon node, each common node as well as the beacon node 210 initiate a self-nomination process according to an embodiment. In this embodiment, the self-nomination process may use a metric that weights an interior node heavier toward election than an exterior node. FIG. 2a may represent the result of an election wherein the beacon node 210 has become the new beacon node in part by virtue of its geographic location. For example, an election may have considered all nodes including the interior common nodes 210 and 212, the election may have also considered all nodes including the exterior common nodes 214 and 216.

In one embodiment, a first metric in the election includes the geographical type of each node, such that the exterior common nodes 214 and 216 are disqualified. In an embodiment after all exterior common nodes are disqualified, the remaining common nodes are interior nodes such as the nodes 210 and 212.

In an embodiment, there remain only the common nodes including the interior common nodes 210 and 212, and a random number generation algorithm is used to elect the node 210 to be the new beacon node 210 over the other interior common nodes including the interior common node 212.

In an embodiment, a geographical centrality metric is used to select among all common nodes. For example, an evaluation may be made of a tally of the total number of node hops that must be accomplished for communication of each node in the wireless network with every other node. In an example embodiment, a node-hop tally is tabulated for each node. An exterior node, e.g., the exterior node 214 must accomplish at least two node hops to reach an interior node, e.g. the interior node 210. And the exterior node 216 must accomplish one node hop to reach the interior node 210. After all node hops are tallied for all nodes, a most central interior node may have a node-hop tally that is less than all other node-hop tallies.

In an embodiment where more than one node may have the same lowest node-hop tally, the metric then weights these nodes by use of a random number generation algorithm.

Thereafter among these nodes, the node with the highest random number, for example, is elected to be the new beacon node. Other methods for breaking ties can be used as well.

Figure 2B:
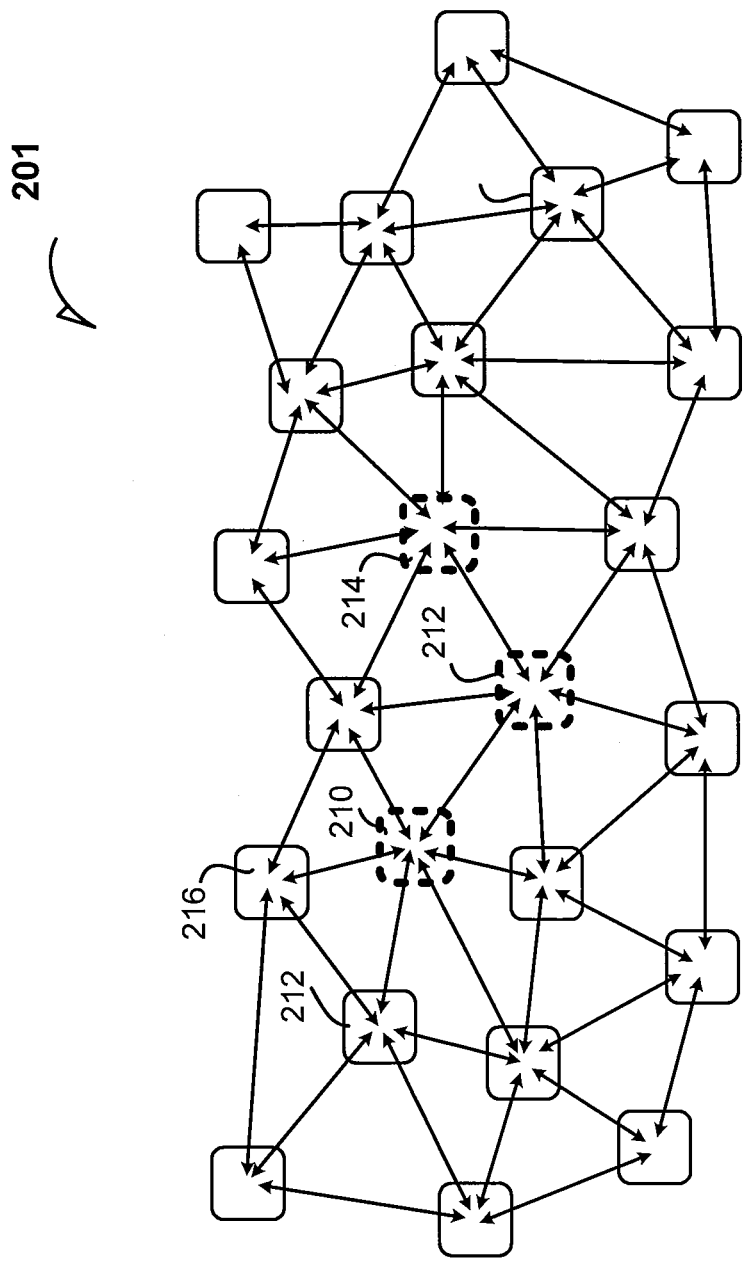
FIG. 2b is a schematic representation of a plurality of nodes that make up a wireless network after the passage of time of the wireless network depicted in FIG. 2a according to an example embodiment.

FIG. 2b is a schematic representation of a plurality of nodes that make up a wireless network 201 after the passage of time of the wireless network 200 depicted in FIG. 2a according to an example embodiment. Several nodes have joined the wireless network 200 depicted in FIG. 2a to become the wireless network 201 depicted in FIG. 2b. Whereas the common node 214 depicted in FIG. 2a was an exterior node, the common node 214 has become an interior node due to the accretion of several other nodes. The beacon node 210 as was depicted in FIG. 2a is depicted in heavy dashed lines to indicate an election for a new beacon node. As depicted, the interior nodes 210, 212, and 214 are all depicted in heavy dashed lines to indicate an election among the three as self-nominated nodes to become the new beacon node. By use of the node-hop tally method embodiment, each of these three interior nodes may be part of the selection process to become the beacon node.

According to the several embodiments set forth in this disclosure, any one of the indicated nodes 210, 212, and 214 may become the new beacon node.

In an embodiment, the frequency of reevaluation of the entire wireless network 210 may be inversely proportional to the size of the wireless network 201. In other words, the probability of any common node becoming the new beacon node is adjusted downwards as the size of the size of the wireless network 201 increases. Consequently, where each node may use the random-number generation method for self-nomination, as the size of the wireless network 201 has increased, each node has a relatively higher threshold to overcome to become a self-nominated node.

In an embodiment, a self-nomination event is being carried out as depicted in FIG. 2b. A node-hop tally method has resulted in three nodes 210, 212, and 214 being tied or otherwise indeterminate as the three most useful nodes that could become the new beacon node.

Figure 2C:
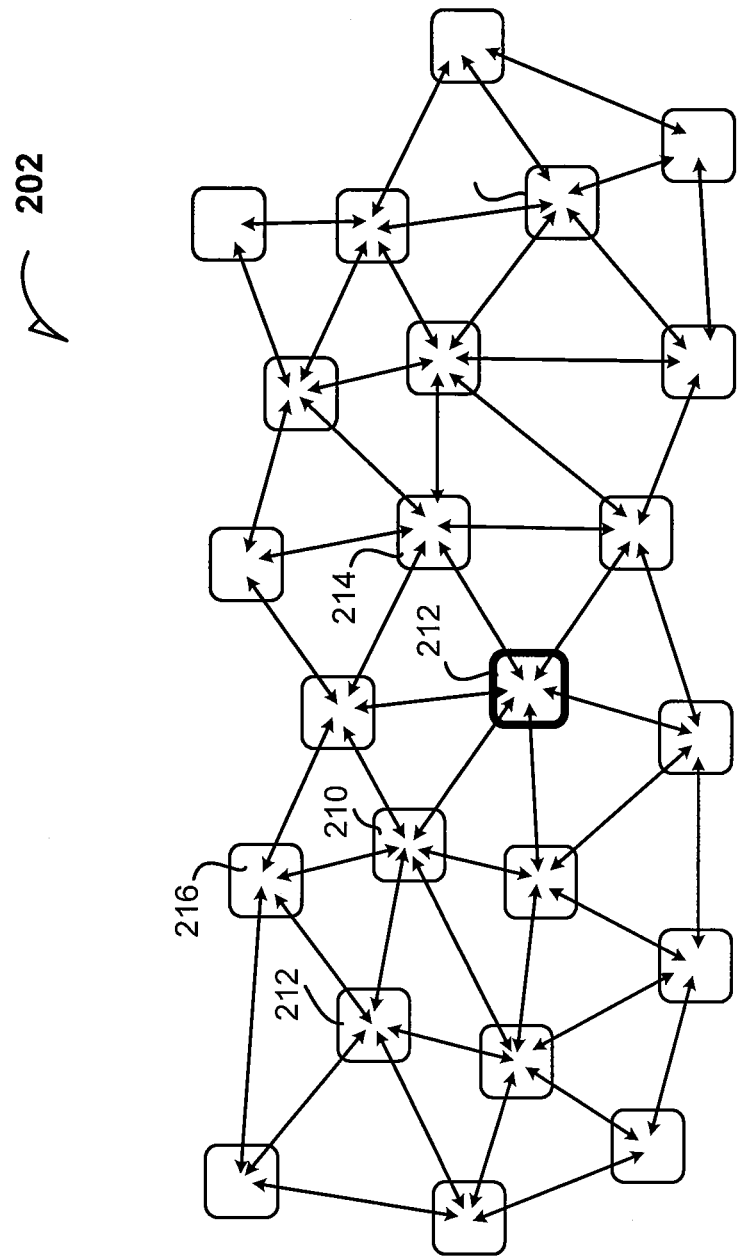
FIG. 2c is a schematic representation of a plurality of nodes that make up a wireless network after the passage of time of the wireless network depicted in FIG. 2a according to an example embodiment.

FIG. 2c is a schematic representation of a plurality of nodes that make up a wireless network 202 after the passage of time of the wireless network 201 depicted in FIG. 2c according to an example embodiment. The node 212 has been elected the new beacon node 212.

Figure 3:
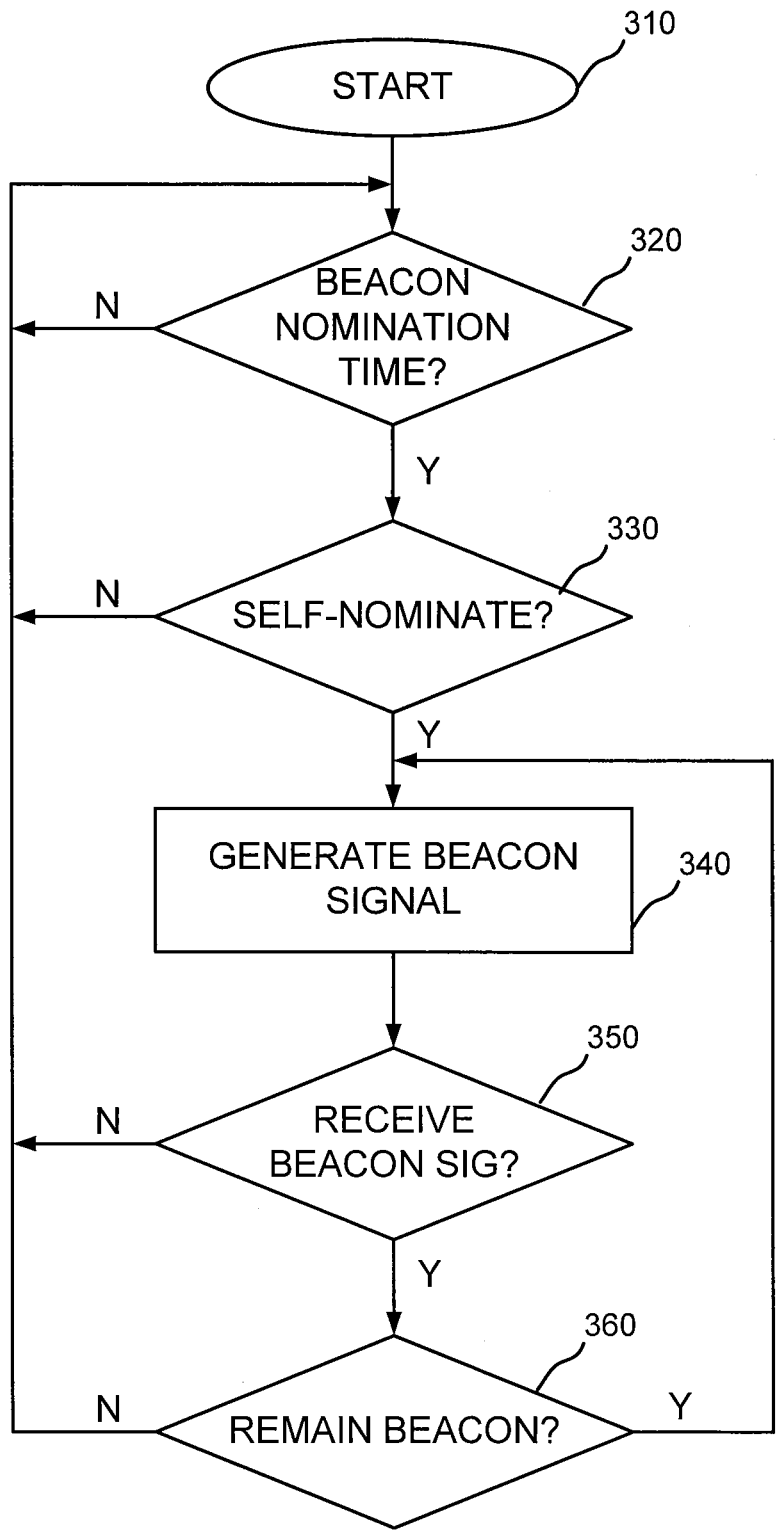
FIG. 3 illustrates a nomination-election process.

FIG. 3 is a diagram of a method flow 300 for electing a beacon node according to an example embodiment.

At 310, the method originates such as when a wireless node has awakened from a sleep-wake cycle. After the origination of the method embodiment, the method proceeds to 320.

At 320, the method includes executing a query whether it is appropriate to nominate itself as a beacon node. A beacon node election time may be appropriate where the beacon node has failed for instance. Beacon node failure may include removal of the mobile platform that was the beacon node or a reduction or blockage in quality of the beacon signal as discussed above.

A beacon node nomination time may be initiated for reasons other than beacon node failure. For example, a metric to trigger a beacon node nomination time may be that the beacon node has a high volume of traffic and that the excessive traffic could cause latency and delay in the beacon node being able to efficiently execute the beaconing process to all other nodes. Other burdens on a beacon node may be a full or near capacity routing table (RT), or a full or near capacity neighbor table (NT). Consequently, comparison between a current beacon node and a neighbor node may reveal the neighbor nodes may have a lesser traffic load and that the lower traffic would make the node better able to operate usefully as the beacon node.

Where there is no useful reason for a beacon node nomination to be carried out, the method may continue by returning to START at 310 including the beacon node executing various functions including the beaconing process.

At 330 where the query results in "true" that a beacon node should be nominated, the method includes determining if each node should self-nominate. In one embodiment, as noted above, a random number generator is used on each node in the wireless network to determine whether the node should self-nominate. In one embodiment, if the random number generated on a particular node is below a certain threshold number, the node self-nominates and, at the beginning of the next cycle, sends out a beacon signal. For example, if the threshold is set at 0.6 and the random number generator generates a number between 0 and 1, the node will send out a beacon signal in those conditions approximately 60% of the time. If the node determines it should self-nominate, control moves to 340 and a beacon signal is generated at the appropriate time. Control then moves to 350.

At 350, each self-nominated node looks to see if it received a beacon signal from another node. If not, control moves to 320 and the node remains the beacon node.

If, however, at 350 a self-nominated node received a beacon signal from another node, control moves to 360.

At 360, each node looks at any beacon signals it has received from other nodes and determines if those nodes have a higher priority for becoming the beacon node. If any of the nodes have a higher priority, control moves to 320 and the node stops sending out beacon signals. If, however, at 350 the node determines that none of the other nodes from which it received a beacon signal have a higher priority, control moves to 340 and a new beacon signal is generated at the appropriate time. The process is repeated until a single beacon node remains.

As noted above, a node may have a higher priority for becoming a beacon node doe to its place in the network, due to its MAC address or link quality, or for whatever other reason selected by the network designer.

The network executing the method above is synchronized by an emergent behavior of the mob of nodes, rather than by that of a selected or predetermined node, or a centralized time authority, or a time reference external to the network.

This beaconing process occurs as well when new networks are established. In one embodiment, a new sleeper node awakens without being preconfigured for a network. A newly powered up node assumes default values for wake and sleep intervals, then stays awake for a whole wake and sleep interval in order to listen for a sync message broadcast. If the node does not detect any beacon signal during that first wake/sleep cycle, it becomes a "loner node" and sends its own beacon signal. A loner node has a high probability of sending out a beacon signal.

If a reply is received as a result of the loner node sending the beacon signal, the loner node makes a decision. The loner node may initiate a command for the node that sent the response to join the loner node in order to form a network. The loner node may also initiate a request to join the node that sent the response. Consequently, a loner node will either join an existing subnet, or it will join to another loner node to form a new network. In an embodiment where the loner node may join a second loner node, the new subnet of two previous loner nodes will attempt to seek out and join to another subnet. In an embodiment where the loner node may join a second loner node, the new subnet of two previous loner nodes then may attempt to aggregate itself with other subnets to make larger networks.

Figure 4:
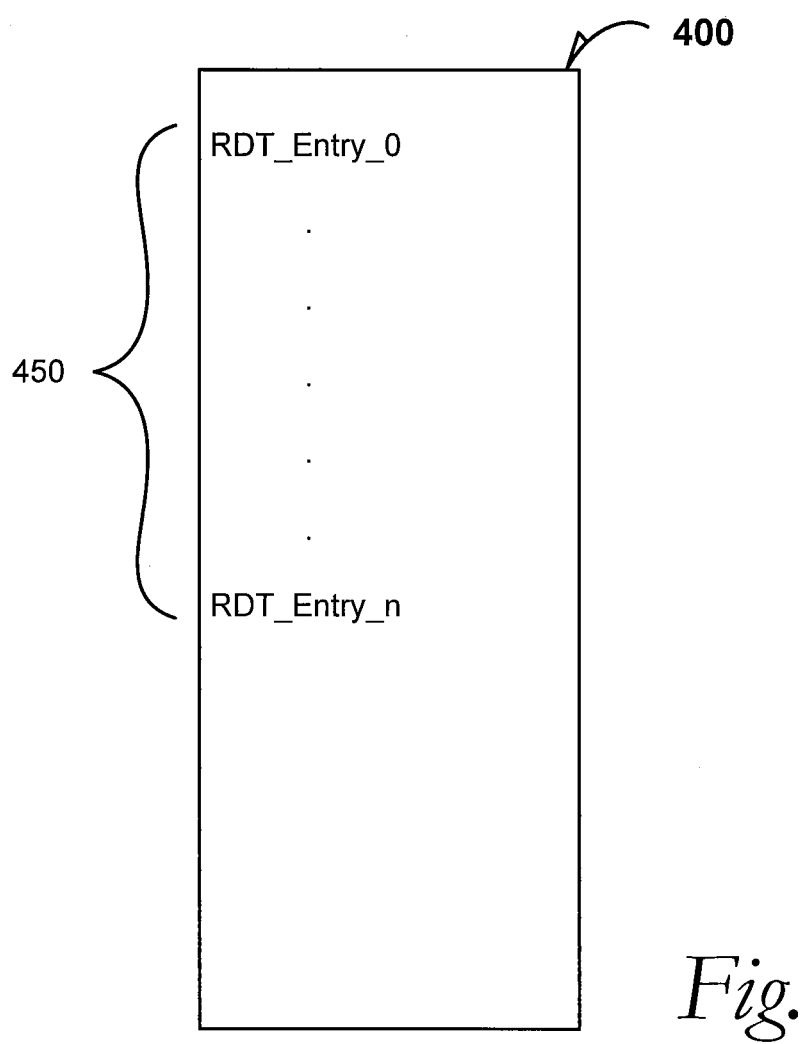
FIG. 4 represents a route-discovery table with a series of route-discovery entries lodged therein.

FIG. 4 is a representation of a route-discovery table (RDT) 400 that may be used to lodge link quality data etc. for modifying a pure random-number election of the new beacon node according to an example embodiment. The RDT 400 includes a plurality of entries 450. In an embodiment, each entry 450 includes information detailing a route discovery in process between the given node and at least the neighbor nodes to the given node. In one such embodiment, each entry 450 includes the following information:

Succ—address of successor node, neighbor of this node that should be used to relay a message beyond the given node.

TalHops—tally of the minimum total number of relays between this node and all other nodes.

In one embodiment, a network layer (NWK) may include a mesh network such as XMesh. A medium-access control (MAC) layer may include a standard such as IEEE 802.15.4, established and periodically updated by the WPAN™ Task Group 4 known in industry. The physical layer (PHY) may be frequent-hopping spread-spectrum (FHSS) radio communication. In one such embodiment, the NWK and MAC layers are used to estimate link quality for a given node as a function of the quality of its component links. The quality of a link between two nodes may be determined as a function of factors such as link count and the signal strength in each link.

Figure 5:
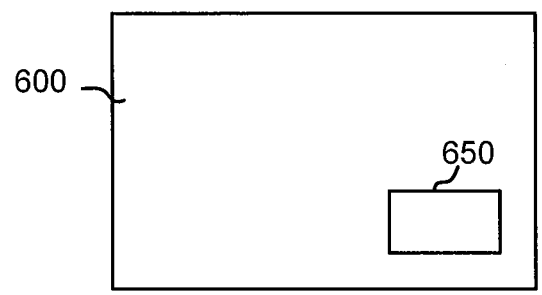
FIG. 5 is a schematic diagram illustrating a medium having an instruction set for replacing beacon nodes according to an example embodiment.

FIG. 5 is a schematic diagram illustrating a medium having an instruction set that results in election of a new beacon node according to an example embodiment. A machine-readable medium 600 includes any type of storage medium such as a disk drive or a solid state memory device, or the like. A machine-readable medium 600 includes instructions within an instruction set 650. The instruction set 650, when executed by a machine such as an information handling system or a processor, cause the machine to perform operations that include electing a new beacon node.

In an example embodiment of a machine-readable medium 600 that includes the instruction set 950, the instructions, when executed by a machine, cause the machine to perform operations such as modifying a random number node election based upon a link-quality metric or a node-burden metric.

Thus, methods and a machine-readable medium including instructions for electing a new beacon node have been described. Although the various methods for electing a new beacon node have been described with reference to specific example embodiments, it will be evident that various modifications and changes may be made to these embodiments without departing from the broader embodiment of the disclosed subject matter. Accordingly, the specification and drawings are to be regarded in an illustrative rather than a restrictive sense.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

We claim:

1. In a wireless network having a plurality of nodes, including a beacon node, a comprising:
   determining, at each node, whether to replace the beacon node;
   if a node determines that the beacon node is to be replaced, determining whether the node should nominate itself as a potential replacement beacon node, wherein determining whether the node should nominate itself as a potential replacement beacon node is a function of a nomination probability associated with the node;
if the node determines that it should nominate itself as a potential replacement beacon node, sending out one or more beacon signals;
receiving beacon signals from other nodes that have nominated themselves as potential replacement beacon nodes; and
selecting the replacement beacon node wherein the selecting includes:
  determining, at each potential replacement beacon node, whether the potential replacement beacon node has received a beacon signal from a higher ranking potential replacement beacon node; and
  if the potential replacement beacon node has received a beacon signal from a higher ranking potential replacement beacon node, removing itself as a candidate for the replacement beacon node;
wherein determining whether the node should nominate itself as a potential replacement beacon node includes generating a random number at the node and comparing the random number to a threshold value.

2. In a wireless network having a plurality of nodes, including a beacon node, a method comprising:
determining, at each node, whether to replace the beacon node;
if a node determines that the beacon node is to be replaced, determining whether the node should nominate itself as a potential replacement beacon node, wherein determining whether the node should nominate itself as a potential replacement beacon node is a function of a nomination probability associated with the node;
if the node determines that it should nominate itself as a potential replacement beacon node, sending out one or more beacon signals;
receiving beacon signals from other nodes that have nominated themselves as potential replacement beacon nodes; and
selecting the replacement beacon node wherein the selecting includes:
  determining, at each potential replacement beacon node, whether the potential replacement beacon node has received a beacon signal from a higher ranking potential replacement beacon node; and
  if the potential replacement beacon node has received a beacon signal from a higher ranking potential replacement beacon node, removing itself as a candidate for the replacement beacon node;
wherein determining whether the node should nominate itself as a potential replacement beacon node includes generating a random number at the node and comparing the random number to a threshold value associated with the node.

3. The method of claim 2, wherein the threshold value associated with the node is a function of a link-quality metric associated with the node.

4. The method of claim 2, wherein the threshold value associated with the node is a function of the location of the node with respect to the other nodes in the wireless network.

5. The method of claim 2, wherein the threshold value associated with the node is a function of a node-hop tally, wherein the node-hop tally includes the total number of node hops required for the node to reach each other node in the wireless network.

6. The method of claim 1, wherein the wireless network includes exterior nodes and interior nodes and wherein determining whether the node should nominate itself as a potential replacement beacon node includes reviewing if the node is an interior or exterior node and preventing nomination if the node is an exterior node.

7. The method of claim 2, wherein determining whether the potential replacement beacon node has received a beacon signal from a higher ranking potential replacement beacon node includes comparing accuracy of timekeeping apparatus of the potential replacement beacon node to accuracy of timekeeping apparatus of the node receiving the beacon signal.

8. The method of claim 2, wherein determining whether the potential replacement beacon node has received a beacon signal from a higher ranking potential replacement beacon node includes comparing a length of time parameter from each node measured from when each node's sleeping parameters was last configured.

9. The method of claim 1, wherein determining whether the potential replacement beacon node has received a beacon signal from a higher ranking potential replacement beacon node includes comparing a parameter stored on each node, wherein the parameter is stored by an operator.

10. The method of claim 9, wherein the parameter is a MAC address.

11. The method of claim 1, wherein determining whether the potential replacement beacon node has received a beacon signal from a higher ranking potential replacement beacon node includes comparing the node-hop tally of the potential replacement beacon node to the node-hop tally of each node that sent a beacon signal, wherein the node-hop tally of each node is the total number of node hops required for the node to reach each other node in the wireless network.

12. The method of claim 1, wherein the threshold value is selected to decrease nominations by nodes from the plurality of nodes as the number of the nodes in the network increases.

13. The method of claim 1, wherein the threshold value is selected to favor nomination of nodes close to the center of the network and disfavor nodes away from the center of the network.

14. The method of claim 1, wherein the threshold value is selected to favor nodes with better link-quality metrics.

15. The method of claim 2, wherein sending out one or more beacon signals includes transmitting a beacon signal periodically as long as the node remains a potential replacement beacon node.

16. The method of claim 15, wherein transmitting a the beacon signal periodically includes determining how many beacon signals were received over a period of time and throttling back transmission of the beacon signals as a function of how many beacon signals were received over that period of time.

17. A wireless network comprising:
a plurality of nodes, wherein each node communicates wirelessly to one or more other nodes in the network and wherein one node operates as a beacon node to synchronize each of the remaining nodes;
wherein each node includes:
a detection mechanism for detecting when the beacon node should be replaced;
a self-nominating mechanism for determining when the node should nominate itself as a potential replacement beacon node; and
an election mechanism for removing the node as a candidate for the replacement beacon node;
wherein the self-nominating mechanism operates to determine whether the node should nominate itself as a potential replacement beacon node, wherein the node nominates itself as a function of a nomination probability associated with the node;

wherein the node transmits a beacon signal to other nodes in the network periodically as long as it remains a potential replacement beacon node; and wherein the election mechanism removes the node as a candidate for the replacement beacon node when the node receives a beacon signal from a higher ranking potential replacement beacon node; and wherein the node determines whether to nominate itself as a potential replacement beacon node by generating a random number at the node and comparing the random number to a threshold value associated with the node.

18. A wireless network comprising:

a plurality of nodes, wherein each node communicates wirelessly to one or more other nodes in the network and wherein one node operates as a beacon node to synchronize each of the remaining nodes;

wherein each node includes:

a detection mechanism for detecting when the beacon node should be replaced;

a self-nominating mechanism for determining when the node should nominate itself as a potential replacement beacon node; and an election mechanism for removing the node as a candidate for the replacement beacon node;

wherein the self-nominating mechanism operates to determine whether the node should nominate itself as a potential replacement beacon node, wherein the node nominates itself as a function of a nomination probability associated with the node;

wherein the node transmits a beacon signal to other nodes in the network periodically as long as it remains a potential replacement beacon node; and wherein the election mechanism removes the node as a candidate for the replacement beacon node when the node receives a beacon signal from a higher ranking potential replacement beacon node;

wherein the node nominates itself as a function of a random number generated by the node and a threshold value associated with the node;

wherein the threshold value associated with the node is a function of a link-quality metric associated with the node.

19. A wireless network comprising:

a plurality of nodes, wherein each node communicates wirelessly to one or more other nodes in the network and wherein one node operates as a beacon node to synchronize each of the remaining nodes;

wherein each node includes:

a detection mechanism for detecting when the beacon node should be replaced;

a self-nominating mechanism for determining when the node should nominate itself as a potential replacement beacon node; and an election mechanism for removing the node as a candidate for the replacement beacon node;

wherein the self-nominating mechanism operates to determine whether the node should nominate itself as a potential replacement beacon node, wherein the node nominates itself as a function of a nomination probability associated with the node;

wherein the node transmits a beacon signal to other nodes in the network periodically as long as it remains a potential replacement beacon node; and wherein the election mechanism removes the node as a candidate for the replacement beacon node when the node receives a beacon signal from a higher ranking potential replacement beacon node;

wherein the node nominates itself as a function of a random number generated by the node and a threshold value associated with the node;

wherein the threshold value associated with the node is a function of the location of the node with respect to the other nodes in the wireless network.

20. A wireless network comprising:

a plurality of nodes, wherein each node communicates wirelessly to one or more other nodes in the network and wherein one node operates as a beacon node to synchronize each of the remaining nodes;

wherein each node includes:

a detection mechanism for detecting when the beacon node should be replaced;

a self-nominating mechanism for determining when the node should nominate itself as a potential replacement beacon node; and an election mechanism for removing the node as a candidate for the replacement beacon node;

wherein the self-nominating mechanism operates to determine whether the node should nominate itself as a potential replacement beacon node, wherein the node nominates itself as a function of a nomination probability associated with the node;

wherein the node transmits a beacon signal to other nodes in the network periodically as long as it remains a potential replacement beacon node; and wherein the election mechanism removes the node as a candidate for the replacement beacon node when the node receives a beacon signal from a higher ranking potential replacement beacon node;

wherein the node nominates itself as a function of a random number generated by the node and a threshold value associated with the node;

wherein the threshold value associated with the node is selected to favor nomination of nodes close to the center of the network and disfavor nodes away from the center of the network.

21. The network of claim 17, wherein the period for transmitting the beacon signal increases as a function of the number of beacon signals received by the node.

22. An article comprising a non-transitory computer readable medium having instructions thereon, wherein the instructions, when executed by a machine, create a system for executing a method comprising:

determining, at each node in a wireless network having a plurality of nodes, whether to replace the beacon node;

if a node determines that the beacon node is to be replaced, determining whether the node should nominate itself as a potential replacement beacon node, wherein determining whether the node should nominate itself as a potential replacement beacon node is a function of a nomination probability associated with the node;

if the node determines that it should nominate itself as a potential replacement beacon node, sending out one or more beacon signals;

receiving beacon signals from other nodes that have nominated themselves as potential replacement beacon nodes; and selecting the replacement beacon node, wherein the selecting includes:

determining, at each potential replacement beacon node, whether the potential replacement beacon node has received a beacon signal from a higher ranking potential replacement beacon node; and if the potential replacement beacon node has received a beacon signal from a higher ranking potential replacement beacon node, removing itself as a candidate for the replacement beacon node;
wherein determining whether the node should nominate itself as a potential replacement beacon node includes generating a random number at the node and comparing the random number to a threshold value.

* * * * *